(12) United States Patent
Zyryanov (10) Patent No.: US 11,409,005 B2
(45) Date of Patent: Aug. 9, 2022

(54) GNSS RECEIVER ADAPTED TO PRODUCE, USE, AND COMMUNICATE SOFTWARE-GENERATED SATELLITE SIGNAL DATA

(71) Applicant: Trimble Inc., Sunnyvale, CA (US)

(72) Inventor: Gleb Aleksandrovich Zyryanov, Moscow (RU)

(73) Assignee: Trimble Inc., Sunnyvale, CA (US)

( * ) Notice: Subject to any disclaimer, the term of this patent is extended or adjusted under 35 U.S.C. 154(b) by 119 days.

(21) Appl. No.: 17/081,134

(22) Filed: Oct. 27, 2020

(65) Prior Publication Data

US 2021/0333413 A1   Oct. 28, 2021

(51) Int. Cl.
*G01S 19/33*   (2010.01)
*G01S 19/22*   (2010.01)
*G01S 19/23*   (2010.01)

(52) U.S. Cl.
CPC .............. *G01S 19/33* (2013.01); *G01S 19/22* (2013.01); *G01S 19/235* (2013.01)

(58) Field of Classification Search
CPC ........ G01S 19/22; G01S 19/235; G01S 19/32; G01S 19/33; G01S 19/43
See application file for complete search history.

(56) References Cited

U.S. PATENT DOCUMENTS

| | | | | |
|---|---|---|---|---|
| 5,701,328 | A * | 12/1997 | Schuchman | G01S 19/46 375/139 |
| 2009/0219201 | A1* | 9/2009 | Martin | G01S 19/32 342/357.62 |

(Continued)

FOREIGN PATENT DOCUMENTS

| | | | | |
|---|---|---|---|---|
| CN | 106526630 A | * | 3/2017 | ............ G01S 19/29 |
| EP | 2012488 A1 | | 1/2009 | |

OTHER PUBLICATIONS

B.W. Parkinson et al., Global Positioning System: Theory and Applications, vol. 1; Progress in Astronautics and Aeronautics, vol. 164, American Institute of Aeronautics and Astronautics, Inc., p. 329-407. (Year: 1996).*

(Continued)

*Primary Examiner* — Bernarr E Gregory
*Assistant Examiner* — Fred H Mull
(74) *Attorney, Agent, or Firm* — Snell & Wilmer L.L.P.; Kent A. Lembke (57) ABSTRACT

A Global Navigation Satellite System (GNSS) receiver that includes a satellite signal generator generating signal data for a signal that is not being tracked by the receiver. The receiver includes a satellite signal generator running an algorithm to process first and second received signals to produce a software-synthesized satellite signal, and the generated signal data is used to correct bias or is communicated to a spaced-apart GNSS receiver or used for onboard positioning calculations. The satellite constellation may be the Galileo constellation, with the first and second signals being E5A and E5B signals tracked by the receiver and the generated third signal being an E5AltBOC signal. With a half-a-cycle bias resolution technique, the satellite signal generator generates synthetic E5AltBOC data of high quality. For a receiver, which physically tracks E5AltBOC, synthetic E5AltBOC may be used to monitor polarity of a physically tracked E5AltBOC and correct it if error is detected.

16 Claims, 9 Drawing Sheets

(56) References Cited

U.S. PATENT DOCUMENTS

| 2012/0026038 | A1* | 2/2012 | Vollath | G01S 19/40 |
| | | | | 342/357.68 |
| 2016/0259061 | A1* | 9/2016 | Carter | G01S 19/34 |
| 2019/0243004 | A1* | 8/2019 | Dill | G01S 19/43 |
| 2022/0011443 | A1* | 1/2022 | De Wilde | G01S 19/32 |

OTHER PUBLICATIONS

M.N. Gallardo et al., Code Smoothing for BOC Ambiguity Mitigation, 2013 International Conference on Localization and GNSS (ICL-GNSS), 6 pages. (Year: 2013).*

Extended European Search Report, for Application No. 21169505.1, dated Aug. 30, 2021.

Sleewaegen, Jean-Marie, De Wilde, Wim, "Galileo E5b Rover Receiving E5a Corrections? No Problem!," Proceedings of the 32nd International Technical Meeting of the Satellite Division of The Institute of Navigation (ION GNSS+ 2019), Miami, Florida, Sep. 2019, pp. 3582-3591.

* cited by examiner

GNSS RECEIVER ADAPTED TO PRODUCE, USE, AND COMMUNICATE SOFTWARE-GENERATED SATELLITE SIGNAL DATA

BACKGROUND

1. Field of the Description

The present description relates, in general, to Global Navigation Satellite System (GNSS) receivers configured to provide higher accuracy (e.g., centimeter-level) positioning. More particularly, the present description relates to a GNSS receiver configured to be more robust and useful as, for example, a rover or base station by being adapted to locally synthesize with onboard software satellite signal data for a signal that is not tracked. Such data may be communicated to other receivers and used during Real-Time Kinematic (RTK) operations or processing of satellite signals to achieve higher accuracy positioning for the GNSS receiver, and such data may be used in the GNSS receiver to monitor the quality of tracked signals.

2. Relevant Background

Satellite navigation devices, such as GNSS receivers (which may also be known as Global Positioning System (GPS) receivers or simply "receivers" herein), are in wide spread use across the world. These devices are designed to be capable of receiving information from GNSS satellites (e.g., those in the GPS, Global Navigation Satellite System (GLONASS), Galileo, and BeiDou) and to then calculate the device's geographical position.

Many satellite navigation devices are used today in the surveying industry to provide accurate mapping of nearly any physical site. In such situations, high precision (e.g., centimeter-level) positioning is often desirable or even required by the surveying industry. To calculate its geographical position, GNSS receivers are often configured with processors and software to perform differential GPS/GNSS. GNSS receivers use timing signals from at least four satellites to establish position, and errors or delays can occur during the transit of the signals to the GNSS receiver's location. Differential GNSS receivers have been developed to correct these errors and inaccuracies in the GNSS system to allow for more accurate positioning information to be provided by each GNSS receiver.

Differential GPS/GNSS is based on the concept that any two receivers within close proximity to one another will experience the same atmospheric errors. For this reason, differential GPS/GNSS makes use of at least two GNSS receivers. One receiver is located in a precisely known location. This receiver is kept stationary and is used as the base or reference station (or receiver) while the second receiver is moved to other locations and is called the roving receiver or rover. The base receiver is adapted to calculate the difference between its position as calculated by processing received signals from GNSS satellites and its actual or known position. The calculated difference is an error correction factor, which is then transmitted to the roving receiver so that it can operate to correct its calculated locations by subtracting the error correction factor. The corrected location information can be applied in real-time in the field (such as by using radio signals) or in post-processing after data capture.

Accuracy of position calculations for GNSS receivers is further enhanced or achieved in practice by implementing (e.g., in an estimator run by an onboard processor) a Real-Time Kinematic (RTK) positioning technique. RTK is used for applications that require higher accuracies (within 1 centimeter or the like), and RTK uses carrier-based ranging and provides ranges and, therefore, positions that are orders of magnitude more precise than those available through other processes (such as code-based positioning). As discussed in the above example, though, RTK techniques, while complicated, were based on the concept of reducing and removing errors common to a base station and a rover pair.

In RTK, the range is calculated by determining the number of carrier cycles between the satellite and the roving receiver and this number is multiplied by the known carrier wavelength. The calculated range includes errors from such sources as satellite clock, ephemerides, ionospheric, and tropospheric delays. To eliminate these errors and to take advantage of the precision of carrier-based measurements, RTK requires measurements to be transmitted from the base station to the roving receiver. A complicated process called "ambiguity resolution" is used to determine the number of whole cycles. Despite its complexity, RTK GNSS receivers can resolve the ambiguities almost instantaneously. Roving receivers determine their position using algorithms (in an estimator) that incorporate ambiguity resolution and differential correction.

From the above discussion, it can be understood that high accuracy GNSS positioning relies on carrier phase measurements and on receiving corrections, e.g., from an RTK network. With the help of the corrections from the network, a rover can compensate for most of the errors affecting its own measurements. Traditionally, a rover received corrections corresponding to the carrier frequencies it was tracking such as two legacy frequencies (such as L1 and L2 for GPS). However, the situation has become more complicated for some satellite constellations where some high-end receivers may track all of or a larger portion of the spectrum while lower end receivers may only track a smaller spectrum or different carrier frequencies. For example, some GNSS receivers do not track the E5AltBOC frequency band of the Galileo satellite system but do track the E5A and/or E5B components or signals from this constellation. For such receivers, it becomes difficult to ensure that the rover gets the corrections it needs to perform the high precision positioning discussed above.

Figure 3:
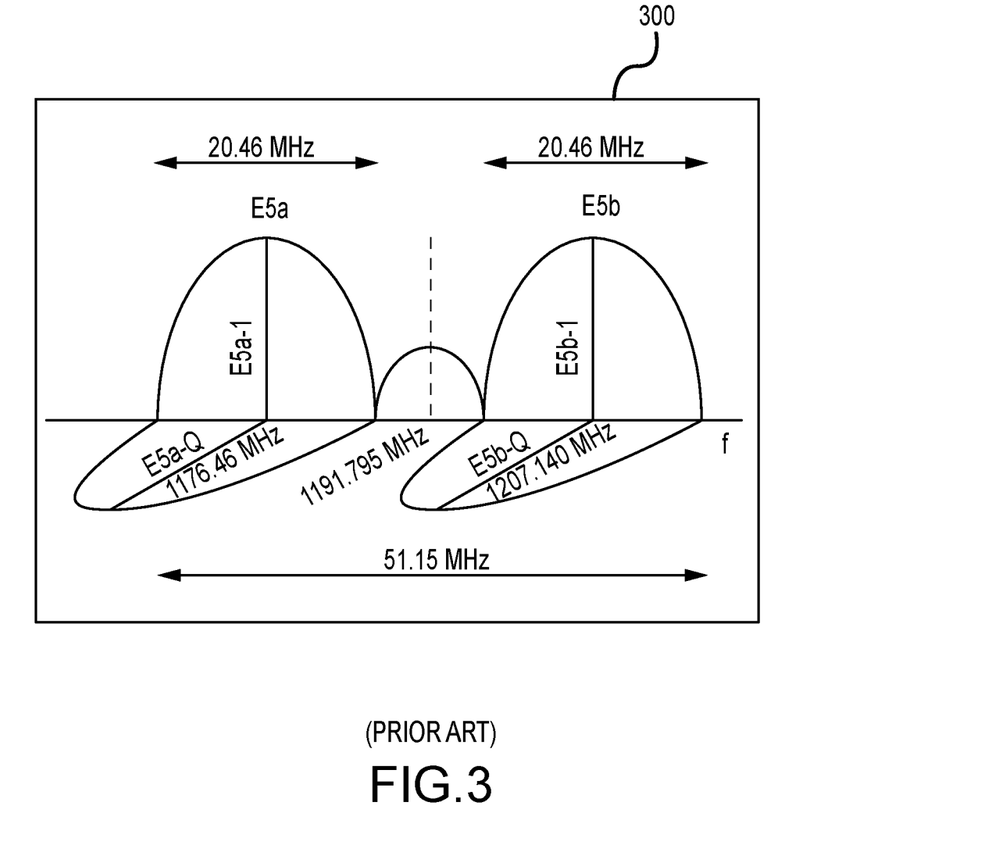
FIG. 3 is a graphical or schematic representation of the Galileo E5 signal spectrum.

As further background on this problem, Galileo satellites feature a modern signal on the E5 band. A rover may track its individual components (E5A or E5B) for some typical receivers or track the whole signal at once (thus tracking the so-called E5AltBOC signal) for some higher end receivers. FIG. 3 provides a graphical representation 300 of the Galileo E5 signal spectrum. Galileo E5 is a Direct Sequence Spread Spectrum (DS-SS) signal with Code Division Multiple Access (CDMA). The Galileo E5 signal has a special modulation known as Alternate Binary Offset Carrier (AltBOC) modulation. The sub-carrier waveforms are chosen to obtain a constant envelope at the transmitter. The result of AltBOC modulation is a split spectrum, as seen in the graphical representation 300 of FIG. 3, around the center frequency. Each sideband is made up of two pseudorandom codes modulated onto the orthogonal components. The in-phase components, E5a-I and E5b-I, carry the data modulation, while the quadrature component, E5a-Q and E5b-Q, are pilot signals.

In practice, a receiver may be adapted to track the individual E5A signal (I or Q components or both), the individual E5B signal (again, I or Q components or both), or the E5AltBOC signal. From the perspective of GNSS processing, these are three different signals with three different nominal frequencies (1176.45 MHz, 1207.14 MHz, and 1191.795 MHz, respectively, as seen in FIG. 3). The E5AltBOC signal typically has a higher immunity to multipath and, thus, is a more preferable signal to track (as is the case with higher end and more expensive receivers). Hence, even though the E5AltBOC signal is considered to be the best signal out of the E5 family of signals, it is not always available or tracked on each receiver used throughout the world, which is due in part to more complex code. In practice, many existing receivers and receiver designs are only adapted to track the E5A and E5B signals for the Galileo satellite system.

While a better signal in many applications (as it has better overall noise characteristics), the E5AltBOC signal is exposed to a risk of incorrect polarity resolution, and this is especially problematic if the signal is acquired by a receiver in a harsh environment. This can result in a half-a-cycle bias, which may put RTK processing at risk and degrade performance of the receiver, e.g., a rover. In contrast, individual components, E5A and E5B, do not present any risk of such a half-a-cycle error and, thus, are generally more reliable.

SUMMARY

To address these and other challenges, a GNSS receiver is provided that includes a satellite signal (or signal data) generator to generate signal data for a signal that is not being tracked by the receiver and/or to correct half-a-cycle bias in a tracked signal. The receiver includes a processor running code (or a software module or application) to provide the functions of a satellite signal generator, and the receiver further includes an antenna assembly receiving first and second signals from a GNSS constellation.

The satellite signal generator runs an algorithm or method to process these two signals to generate or produce a third signal associated with that satellite constellation, and the signal data for this third signal may be used onboard to correct bias and/or may be communicated to a spaced-apart GNSS receiver (e.g., a base station when the receiver is a rover) or used in positioning calculations. In one useful example, the satellite constellation is the Galileo constellation, the first and second signals are E5A and E5B signals tracked by the receiver, and the third signal that is software generated is the E5AltBOC signal. In this example, the receiver operates to perform simultaneous E5A and E5B tracking, and, with the help of a half-a-cycle bias resolution technique, the satellite signal generator generates synthetic E5AltBOC data of a very high quality.

The new GNSS receiver may, as a result, operate to generate Galileo E5AltBOC carrier phase and code computed from available E5A and E5B carrier phases and code. This allows the non-AltBOC-capable reference receiver to generate decent quality AltBOC signal data and, thus, to be compatible with any AltBOC-capable rover receiver. Additionally, this allows the non-AltBOC-capable rover receiver to generate decent quality AltBOC signal data and, thus, to be compatible with any AltBOC-capable reference receiver. For AltBOC-enabled receivers (base or rovers), this reconstructed AltBOC signal data may be used for AltBOC carrier phase polarity verification such as to correct for half-cycle error that may appear on the real AltBOC signal. The new approach utilizes dual-band data and, thus, provides software-generated signal data with much lower noise that is suitable for high-end receivers.

Due to its actual mixture of E5A and E5B signals and half-cycle ambiguity resolution, the new method (and receivers implementing such a method) provides truly software-generated AltBOC signal data with better noise characteristics compared to original E5A and E5B signal data. For code, phase, and Doppler observables, the method takes a combination of the data from the E5A and E5B signals. A unique feature of the new method is that it maintains the integer nature of carrier phase ambiguity during dual-band AltBOC signal generation. Two algorithms are considered for this. One algorithm accomplishes this by constructing single-band AltBOC signals followed by estimation of parity for E5A and E5B ambiguities and correction of dual-band reconstructed AltBOC signal data with 0.5 cycle correction when parity does not match. The second algorithm accomplishes this by constructing E5A and E5B carrier phase difference, corrected for geometry and ionosphere, followed by estimation of parity for E5A minus E5B ambiguities and correction of dual-band reconstructed AltBOC signal data with 0.5 cycle correction when parity does not match.

More particularly, a receiver is provided for processing satellite signals. The receiver, e.g., a GNSS receiver used as a rover or base station/reference, includes an antenna assembly with a sensor tracking assembly tracking and receiving satellite signals from a constellation of Global Navigation Satellite System (GNSS) satellites. The receiver further includes a processor and a satellite signal generator module, provided by the processor executing code, that functions to generate satellite signal data for non-tracked signals by processing raw signal data for the received satellite signals. The receiver also includes a measurement preparation module processing the generated satellite signal data to generate prepared GNSS raw signal data. A measurements usage module is provided in the receiver for processing the prepared GNSS raw signal data to determine a geographical position solution. In some preferred embodiments, the constellation is the Galileo system of satellites, and the generated satellite signal data is Galileo E5AltBOC raw signal data.

In some receiver implementations, the received satellite signals are E5A and E5B signals, and the non-tracked signals are Galileo E5AltBOC signals (or, stated differently, the receiver is not adapted for or capable of tracking the E5AltBOC signal). In such receivers, the generated satellite signal data may include: (a) an E5AltBOC pseudorange determined as a mean value of pseudoranges in the E5A and E5B signals; (b) an E5AltBOC Doppler observable determined as a mean value of Doppler observable in the E5A and E5B signal; and (c) E5AltBOC carrier phase data determined as a mean value of carrier phase data in the E5A and E5B signals. Further, in such receivers, the satellite signal generator module may be adapted to determine when reconstructed carrier phase data falls into different categories with respect to a half-a-cycle ambiguity, which is caused by matching or non-matching parity of original E5A and E5B ambiguities and, when needed, to eliminate the half-a-cycle ambiguity during the generating of the generated satellite signal data for one of the groups.

In other implementations of the receiver, the received satellite signals are E5AltBOC signals (i.e., the receiver is configured for tracking these signals for the Galileo system). In such receivers, the measurement preparation module extracts E5A and E5B raw data from the received satellite signals. Further, the satellite signal generator generates E5AltBOC raw signal data from the extracted E5A and E5B raw data, and the measurement preparation module verifies and corrects polarity of the E5AltBOC signals in the received satellite signals using the generated E5AltBOC raw signal data.

In some cases, the receiver may include a transceiver operable to establish a communication link with a spaced-apart GNSS receiver and to receive data from the spaced-apart GNSS receiver including correction data associated with the generated satellite signal data. In other cases, the received satellite signals may include E5A and E5B signals, and the generated satellite signal data may include E5AltBOC signal data. Then, the receiver may also include a transceiver operable to establish a communication link with a spaced-apart GNSS receiver operating as a rover and to transmit the generated satellite signal data for use in RTK positioning operations.

DETAILED DESCRIPTION

Briefly, the following description is directed toward methods of generating satellite signal data for a non-tracked signal to provide enhanced positioning precision and is further directed toward electronic devices that implement such methods (each which may be labeled "a GNSS receiver" or simply "receiver" herein). The new methods are particularly well suited for generating an E5AltBOC signal (or its signal data) by processing tracked Galileo E5A and E5B signals. There are three main problems that were recognized by the inventor and that the new methods and GNSS receivers address.

With regard to the first problem, for standard RTK or post-processing operations, one of the fundamental steps in processing is building of Single-Difference (SD) observations. In order to do this, data from matching signals should be available from base and rover receivers. Thus, the base station should provide the most signals possible for the rover to be able to find the best match for its RTK operation. However, in the example of processing Galileo signals, some base receivers are capable of tracking Galileo E5A and E5B signals but are not capable of tracking the E5AltBOC signal due to its higher complexity. To solve this first problem, the inventor discovered that software-generated E5AltBOC signal data could enable those receivers to generate the full spectrum of Galileo E5 signals. This will have a positive impact on rover receiver performance and a user's productivity in the field.

With regard to the second problem, for standard RTK or post-processing operations, one of the fundamental steps in signal and position processing is building single-difference (SD) observations. In order to do this, it is typically preferable to have data from matching signals from base and rover receivers. Often, the base station operates to provide data for only certain signals. For the L5 band, for example, the E5AltBOC signal is often selected since this signal usually has better multipath mitigation characteristics. However, some rover receivers are capable of tracking Galileo E5A and E5B signals but are not capable of tracking the E5AltBOC signal due to its higher complexity. To solve this second problem, software generated E5AltBOC signal data could be used to enable those rover receivers' processing of Galileo E5AltBOC signal data, which they receive from the base receiver. This will have a positive impact on rover receiver performance and user's productivity in the field.

With regard to the third problem for a receiver in the field that tracks Galileo E5AltBOC signals, there exists a risk of providing Galileo E5AltBOC carrier phase with a half-a-cycle bias. Typically, a GNSS receiver (e.g., its satellite tracking module) is not able to detect this bias, and the bias may last a relatively long time (e.g., until loss of lock occurs), which may compromise the receiver's RTK/PPP performance. The inventor discovered that the software-generated E5AltBOC signal created to solve the first problem may also (or alternatively) be used for half-a-cycle bias detection. Hence, the E5AltBOC signal data can be used in such a E5AltBOC signal-tracking receiver to either repair the signal data or trigger a tracking channel reset.

It should be understood that the first and second problems discussed above equally apply to real-time processing and to post processing. The second problem equally applies to RTK (including network RTK, e.g., VRS) and PPP (e.g., RTX) operations.

With these problems and solutions in mind, the new GNSS receiver is configured (with software/firmware and/or hardware) to: (a) perform an algorithm to provide software-based generation of an E5AltBOC signal (e.g., its signal data), which may involve a procedure to reconstruct E5AltBOC signal data from its two individual components (i.e., E5A and E5B signal data); (b) using the software-generated E5AltBOC data on a reference receiver to provide this data to a roving receiver for RTK operations; (c) using the software generated E5AltBOC data on a rover receiver when working with reference data, which contains E5AltBOC signal data; and (d) using the software-generated E5AltBOC data on a rover receiver to validate polarity of tracked E5AltBOC signal data to eliminate potential half-a-cycle biases.

Figure 1:
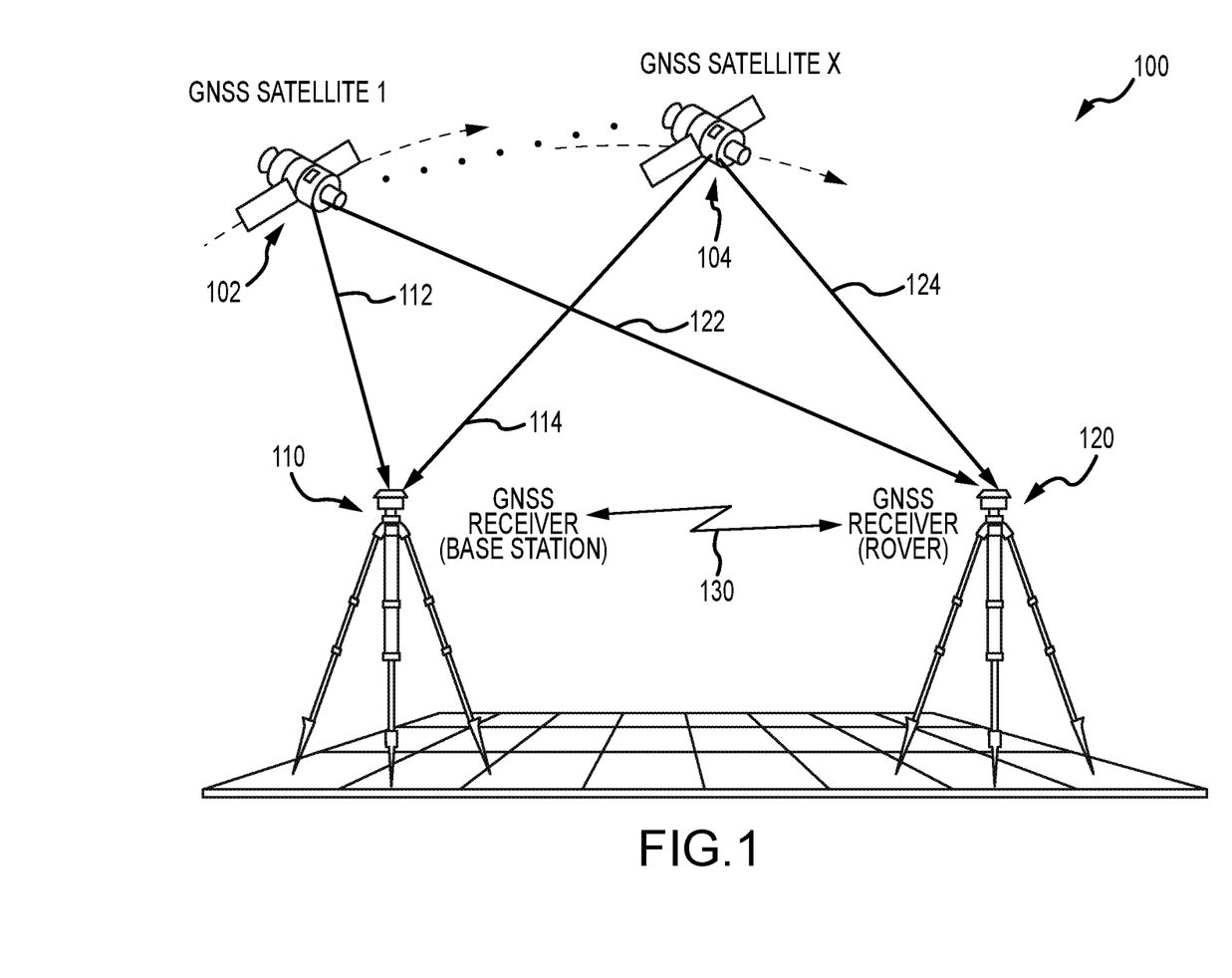
FIG. 1 is a schematic representation of a satellite navigation system with GNSS receivers operable with logic or software to generate non-tracked satellite signal data from tracked satellite signal data according to the present description.

FIG. 1 illustrates generally a satellite navigation system 100 that may be used to implement the methods and algorithms described herein to provide, use, and communicate software-generated satellite signal data (e.g., E5AltBOC signal data). The system 100 includes a plurality of GNSS satellites 102, 104 from one or more GNSS constellations or systems, e.g., the Galileo satellite system. The system 100 further includes a first GNSS receiver 110 that is positioned at a known location and is acting as a base receiver or base station and a second receiver 120 that may be moved by an operator relative to the base station 110 and is acting as a roving receiver or rover. The GNSS receivers 110, 120 may take the form of nearly any on-the-market GNSS receiver or yet to be developed and distributed GNSS receiver including standalone models used in surveying applications (as shown) or those built into other electronic devices (such as automotive vehicles, smartphones/devices, and the like). As shown with arrows 130, a real-time communication channel connects the base and roving receivers 110, 120 (e.g., each includes wireless communication components such as transceivers to provide the communication channel 130).

During operations, the receivers 110, 120 each receive signals 112, 114, 122, and 124 from the visible GNSS satellites 102, 104. Further, the two receivers 110, 120 are configured with logic or executing code/software to provide the positioning techniques described herein including onboard generation of a satellite signal from signals 112, 114, 122, and/or 124 for a signal that is not tracked or received such as E5AltBOC signal from received/tracked E5A and E5B signals. The generated signal data may be used in positioning calculations (with corrections from a base station) and/or may be used to identify and/or correct any half-a-cycle bias in receiver 110 or 120.

Figure 2:
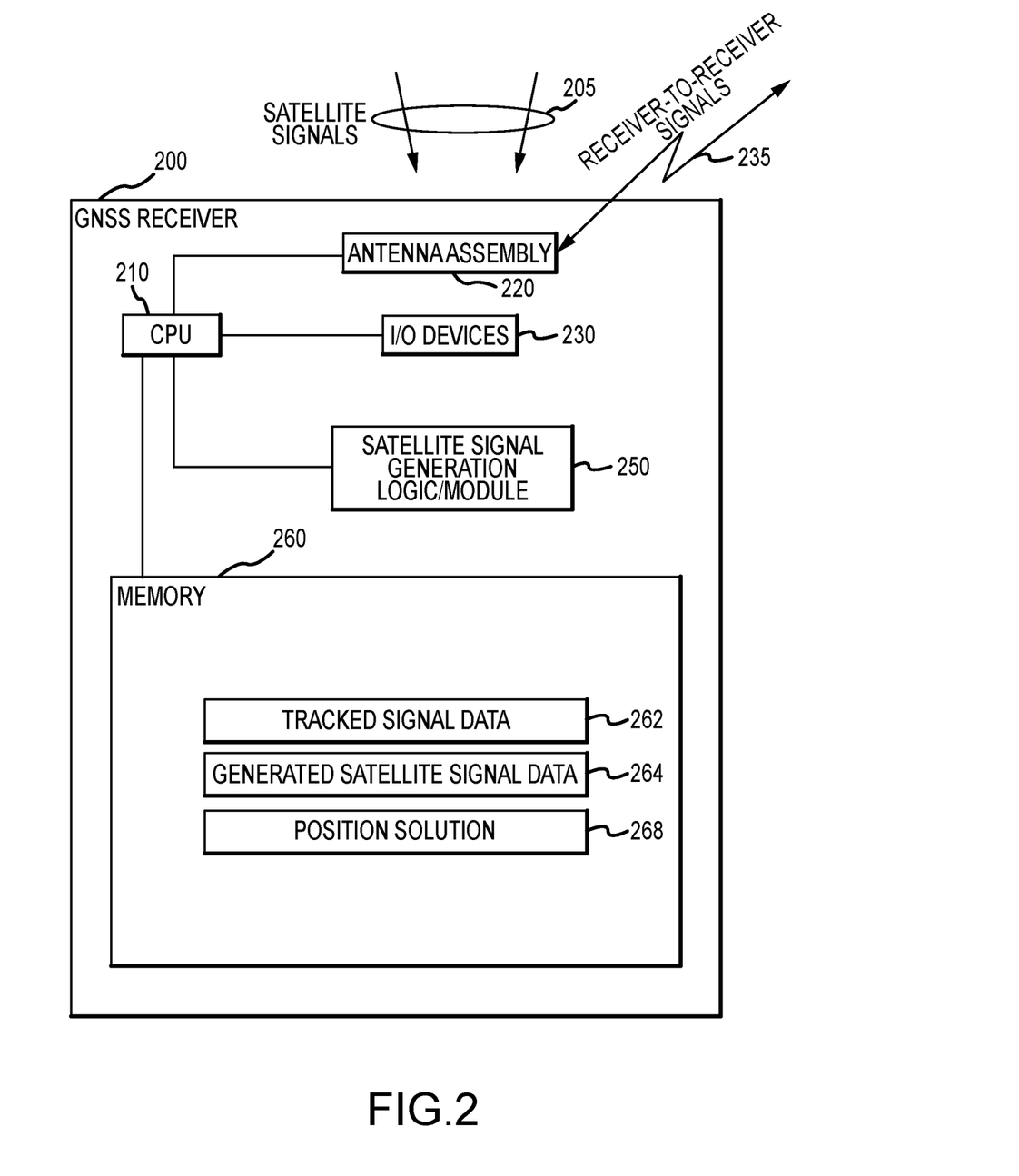
FIG. 2 is a functional block diagram of a GNSS receiver, which may be used in the system of FIG. 1, configured for software-generated satellite signal logic of the present description.

FIG. 2 is a functional block diagram of a GNSS receiver 200, which may be used in the system of FIG. 1, configured with (or to run) satellite signal generation logic 250 of the present description. The GNSS receiver 200 may take the form of nearly any electronic device configured to determine geographical location based on receipt and processing of signals from a set of GNSS satellites (e.g., Galileo system satellites) such as a GNSS receiver used in surveying applications. The GNSS receiver 200 includes a processor(s) 210 managing operations of an antenna assembly 220 configured to receive signals 205 from visible satellites in one or more GNSS systems or constellations. This data may be stored by the processor 210 in onboard memory 260 as shown as tracked signal data 262, and it should be noted that the receiver 200 may be used as a standalone GNSS receiver or, as is often the case, a base receiver or a roving receiver. As one useful example, the signals 205 are Galileo E5A and E5B signals to provide the full E5 spectrum by providing Galileo E5AltBOC signals.

The receiver 200 further includes input/output (I/O) devices 230 whose operations are also managed by the processor 210, and the I/O devices 230 include wireless communication components allowing the GNSS receiver 200 to communicate with other GNSS receivers (not shown) such that the GNSS receiver 200 may act as a base station or a rover in a surveying pair to support SD and DD positioning techniques. In this regard, the other GNSS receiver may transmit its collected data in messages/signals that may include error or bias correction (e.g., for the signal 264 generated by logic 250 in some cases), and this data may be stored in the memory 260 by the processor 210. Further, the signals 235 may include satellite signal data 264 generated by the GNSS receiver 200 using the methods/algorithms taught herein to process the tracked signal data 262 to assist the other GNSS receiver or the GNSS receiver 200 in performing positioning calculations to provide a position solution 268.

At this point in the description, it may be useful to specifically describe the algorithms used in generating a satellite signal from a pair of tracked signals. Particularly, algorithms for generating an E5AltBOC signal from an E5A and an E5B signal are described. E5A, E5B, and E5AltBOC signals are located very close in the spectrum. The E5AltBOC nominal frequency is located exactly in the middle between the E5A and E5B frequencies.

With this in mind, the inventor determined that mean values of E5A and E5B pseudoranges and Doppler observables are very good estimates for E5AltBOC pseudorange and Doppler observables, respectively. Further, due to a good stability of the E5A-E5B-E5AltBOC inter-signal bias and its consistency across satellites, the mean value of E5A and E5B carrier phases is a good estimate for E5AltBOC carrier phase data. Such a combination of carrier phase observables will feature the following. First, it will be biased compared to the original AltBOC signal but, fortunately, RTK processing modules perform Double Different (DD) processing prior to making an Integer Ambiguity Search (which is typically essential for precise positioning). Further, this bias, being common for all satellites, will cancel out in the DD processing. Second, the combination of carrier phase observables may have a half-a-cycle ambiguity on some individual satellites. This may compromise RTK processing performance, and the inventor designed the new algorithm to eliminate this ambiguity.

The half-a-cycle bias comes from the fact that the (E5A+E5B)/2 carrier phase value contains an (N1+N2)/2 ambiguity term, where N1 and N2 are integer ambiguities of E5A and E5B carrier phases. If (N1+N2) is an even number, reconstructed AltBOC data will feature an integer ambiguity, and, if (N1+N2) is an odd number, the reconstructed AltBOC signal data will have a half-a-cycle ambiguity (or half-a-cycle bias). In the algorithm carried out by the new GNSS receiver, the AltBOC data is corrected for this half-a-cycle bias before further processing.

In order to identify the parity of (N1+N2) in the ambiguity term, the following steps are performed (e.g., by the new signal data generation module) or items are taken into account: (a) construct E5AltBOC using E5A data only (labeled "A1"); (b) construct E5AltBOC using E5B data only (labeled "A2"); (c) both A1 and A2 have some residual ionosphere and code noise, but both are introduced with relatively small coefficients; (d) the value (A1−A2) will contain ionosphere noise, code noise, differential-phase bias, and the value (N1−N2); (e) since introduced ionosphere and code noise are far less than a cycle, estimate fractional differential-phase bias (bias E5A minus bias E5B) by averaging the data from all available satellites; (f) having estimated a fractional part of the differential-phase bias, identify the parity of the (N1−N2) term; (g) since the integer part of the differential-phase bias is unknown, additional 0.5 cycle bias may be introduced (while correcting for half-a-cycle) for all satellites, which does not present any risk because it will cancel out in the DD construction; (h) since it is desirable to maintain bias consistency while not introducing any parasitic cycle slips, it is useful to remember estimated bias and verify its consistency over time such as by aligning estimated biases from next epochs to the one originally estimated; and (i) in case of some bias divergence, a loss-of-lock indicator can be triggered for the generated AltBOC signals.

In many preferred implementations, in order to identify the parity of (N1+N2) in the ambiguity term, the steps discussed above are performed (e.g., by the new signal data generation module) with steps (a)-(e) being replaced with the following steps (and with steps (f)-(i) performed as described): (a) compute phase difference (PhaseE5A minus Phase E5B); (b) correct this phase difference for geometric part (distance, tropo, etc.) and for ionospheric part by adding a combination of CodeE5A and CodeE5B; (c) the value of this corrected phase difference will contain code noise and bias, differential-phase-bias, and the value (N1−N2)—the difference of ambiguities; and (d) since the coefficient applied to code combination is very small, the effect of code noise and bias is far less than a cycle, and this allows reliable estimation of a fractional differential-phase-bias (bias E5A minus bias E5B) by averaging the data from all available satellites.

The following notations are used for signal data obtained from received/tracked satellite signals and for data of the satellite signal generated from processing such data:
Phase1=carrier phase of E5A signal (in cycles of E5A band)
Phase2=carrier phase of E5B signal (in cycles of E5B band)
PhaseA=carrier phase of E5AltBOC signal (in cycles of E5AltBOC band)
f1=frequency of E5A signal (in Hz)
f2=frequency of E5B signal (in Hz)
fA=frequency of E5AltBOC signal (in Hz)
c=speed of light (in m/s)
code1=code (PseudoRange) of E5A signal (in meters)
code2=code (PseudoRange) of E5B signal (in meters)
codeA=code (PseudoRange) of E5AltBOC signal (in meters)
I=Ionosphere at E5AltBOC frequency (in meters)
N1=E5A carrier phase ambiguity (integer number of cycles)
N2=E5B carrier phase ambiguity (integer number of cycles)
phaseBias1=fractional E5A phaseBias
phaseBias2=fractional E5B phaseBias
codeBias1=E5A codeBias
codeBias2=E5B codeBias
dist=geometrical component of observables (distance, orbit errors, satellites clock errors, receiver clock, troposphere).

Using these notations, the following formulas, which are carried out by the signal data generation module or software, may be provided or defined (with noise omitted for simplicity):

$$\text{Phase1}=(f1/c)*\text{dist}-(f1/c)*(fa*fa)/(f1*f1)*I+N1+\text{phaseBias1}$$

$$\text{Phase2}=(f2/c)*\text{dist}-(f2/c)*(fa*fa)/(f2*f2)*I+N2+\text{phaseBias2}$$

$$\text{Phase}A=(fA/c)*\text{dist}-(fA/c)*I+NA+\text{phaseBias}A$$

$$\text{Code1}=\text{dist}+(fA*fA)/(f1*f1)*I+\text{codeBias1}$$

$$\text{Code2}=\text{dist}+(fA*fA)/(f2*f2)*I+\text{codeBias2}$$

$$\text{Code}A=\text{dist}+I+\text{codeBias}A$$

Since fA=(f1+f2)/2, it becomes clear that: (Code1+Code2)/2=CodeA+(((fa*fa)/(f1*f1)+(fa*fa)/(f2*f2))/2−1.0)*I+(codeBias1+codeBias2)/2−codeBiasA. This coefficient of residual Ionosphere will be (((fa*fa)/(f1*f1)+(fa*fa)/(f2*f2))/2−1.0)=0.000497476 (approx.), which is a very small value. With 10 meters ionosphere, it will introduce additional error of just 4 mm. CodeBias will be shifted by "(codeBias1+codeBias2)/2−codeBiasA", which will be readily absorbed by receiver clock estimate, so it will have no negative effect on positioning. Typically, it will also (statistically) reduce noise by a factor of 1/sqrt(2). As can be appreciated from the above, the calculations for code are straightforward.

Now, the formulas pertaining to phase may be given as follows:

$$(\text{Phase1}+\text{Phase2})/2=\text{Phase}A-(((f1/c)*(fa*fa)/(f1*f1)+(f2/c)*(fa*fa)/(f2*f2))/2-(fA/c))*I+(N1+N2)/2+(\text{phaseBias1}+\text{phaseBias2})/2-\text{phaseBias}A$$

Residual Ionosphere coefficient will be:

$$(((f1/c)*(fa*fa)/(f1*f1)+(f2/c)*(fa*fa)/(f2*f2))/2-(fA/c))=0.000659149 \text{ (approx.)}$$

Thus, with 10 meters ionosphere, introduced error will be less than 0.007 cycle.

Phase bias ((phaseBias1+phaseBias2)/2−phaseBiasA) will be identical for all satellites, thus will not introduce any problems for a RTK rover because it will cancel out in DD construction. The only remaining part is the ambiguity term: (N1+N2)/2. Having a continuous tracking of E5A and E5B, this will remain a constant number. Unfortunately, this number may be non-integer in cases where parities of N1 and N2 do not match. Such a half-a-cycle ambiguity is not acceptable for a typical RTK rover and has to be corrected for.

To implement a first technique for estimating the parity of (N1+N2) (as noted above there are at least two useful approaches), PhaseA is reconstructed using Phase1 only and using Phase2 only:

$$\text{Phase}A1=\text{Phase1}+(fa-f1)/c*\text{Code1}=\text{Phase}A+\text{coef1}*I+\text{bias1}+\text{noise1}+N1$$

$$\text{Phase}A2=\text{Phase2}+(fa-f2)/c*\text{Code2}=\text{Phase}A+\text{coef2}*I+\text{bias2}+\text{noise2}+N2$$

These two reconstructed phases will have high noise and will be affected by ionosphere, but they will maintain the integer nature of ambiguity.

Subtracting (PhaseA1−PhaseA2)=(bias1−bias2)+noise+(N1−N2) while considering the fact that: (a) bias1−bias2 may be considered to be identical for all satellites; (b) ionosphere coefficient is relatively low; and (c) code-noise is multiplied by a small coefficient and is expected to be within 0.1 cycle. This way we (omitting noise for simplicity) computed the value of (N1−N2)+fractionalBias.

In place of this approach, the following or second technique may be used to estimate parity of (N1+N2) that may be more accurate and/or efficient in many settings. This new approach is a purely dual-band approach, which does not require individual A1 and A2 values. Moreover, unlike the previous approach, this one often will prove better since it fully removes the ionospheric part from the equation. This second technique involves computing the estimate of (N1−N2), which has the same parity as the (N1+N2):

$$\text{Phase1}-\text{Phase2}=(f1/c)*\text{dist}-(f1/c)*(fa*fa)/(f1*f1)*I+N1+\text{phaseBias1}--(f2/c)*\text{dist}+(f2/c)*(fa*fa)/(f2*f2)*I-N2-\text{phaseBias2}$$

$$\text{Phase1}-\text{Phase2}=((f1-f2)/c)*\text{dist}-(f1/c)*(fa*fa)/(f1*f1)*I+N1+\text{phaseBias1}-+(f2/c)*(fa*fa)/(f2*f2)*I-N2-\text{phaseBias2}$$

Compute ionosphere coefficient for (Phase1−Phase2):

$$(f1/c)*(fa*fa)/(f1*f1)+(f2/c)*(fa*fa)/(f2*f2)==-(fa*fa)/(f1*c)+(fa*fa)/(f2*c)=(fa*fa*(f1-f2))/(f1*f2*c)=((f1-f2)/c)*(fa*fa)/(f1*f2)$$

$$Phase1-Phase2=((f1-f2)/c)*\text{dist}+((f1-f2)/c)*(fa*fa)/(f1*f2)*I+(N1-N2)+(\text{phaseBias1}-\text{phaseBias2})$$

$$((f1-f2)/c)*\text{Code1}=((f1-f2)/c)*\text{dist}+((f1-f2)/c)*(fa*fa)/(f1*f1)*I+((f1-f2)/c)*\text{codeBias1}$$

$$((f1-f2)/c)*\text{Code2}=((f1-f2)/c)*\text{dist}+((f1-f2)/c)*(fa*fa)/(f2*f2)*I+((f1-f2)/c)*\text{codeBias2}$$

Subtracting any combination of two codes:

$$((f1-f2)/c)*(a*\text{Code1}+(1-a)*\text{Code2}) \text{ from (Phase1}-\text{Phase2)}$$

will completely eliminate geometrical part (dist). And, as long as |a|<=1, the additional noise level introduced by code value will not grow.

$$\text{Code1iono}=((f1-f2)/c)*(fa*fa)/(f1*f1)=(\text{approx.})-0.105058780554$$

$$\text{Code2iono}=((f1-f2)/c)*(fa*fa)/(f2*f2)=(\text{approx.})-0.099784715084$$

$$\text{PhaseDiff\_iono}=((f1-f2)/c)*(fa*fa)/(f1*f2)=(\text{approx.})-0.102387794608$$

Since, Code1iono<PhaseDiff_iono<Code2iono, an optimal coefficient a (|a|<1 may be computed, which would also eliminate ionosphere from the difference (Phase1−Phase2):

$$a=(\text{Code2iono}-\text{PhaseDiff\_iono})/(\text{Code2iono}-\text{Code1iono})=(\text{approx.}) \, 0.493562231760$$

Finally, one arrives at the following:

$$(Phase1-Phase2)-((f1-f2)/c)*(a*\text{Code1}+(1-a)*\text{Code2})=(N1-N2)+(\text{phaseBias1}-\text{phaseBias2})-((f1-f2)/c)*(a*\text{codeBias1}+(1+a)*\text{codeBias2})$$

(phaseBias1−phaseBias2) can be considered to be identical across all satellites and coefficient ((f1−f2)/c)=(approx.)−0.102370820816
So, even a meter-level codeBias/multipath would transform only just 0.1 cycle in the Phase difference. Such accuracy is more than enough for identifying parity of the given Phase difference. Thus (omitting phase noise and noise introduced by code) we have computed the value of (N1−N2)+fractionalBias.

For clarity, let us define a notation (N1−N2)+fractionalBias=dN, which is computed by using either the first or the second approach. One now can estimate the average fractional part of dN over all satellites, and then for each satellite one can analyze the following value:

Nearest Integer Of (*dN*−averageFractionalPart)

This value may be either odd or even and, thus, form two groups of satellites. For one group of these satellites, reconstructed original PhaseA should be corrected by 0.5 cycles. As a result, the integer nature of DD ambiguities is maintained across all Galileo E5AltBOC carrier phases. Across epochs, the averageFractionalPart value is controlled to prevent its rollover, constraining the new value to be close to the previous one.

Figure 4:
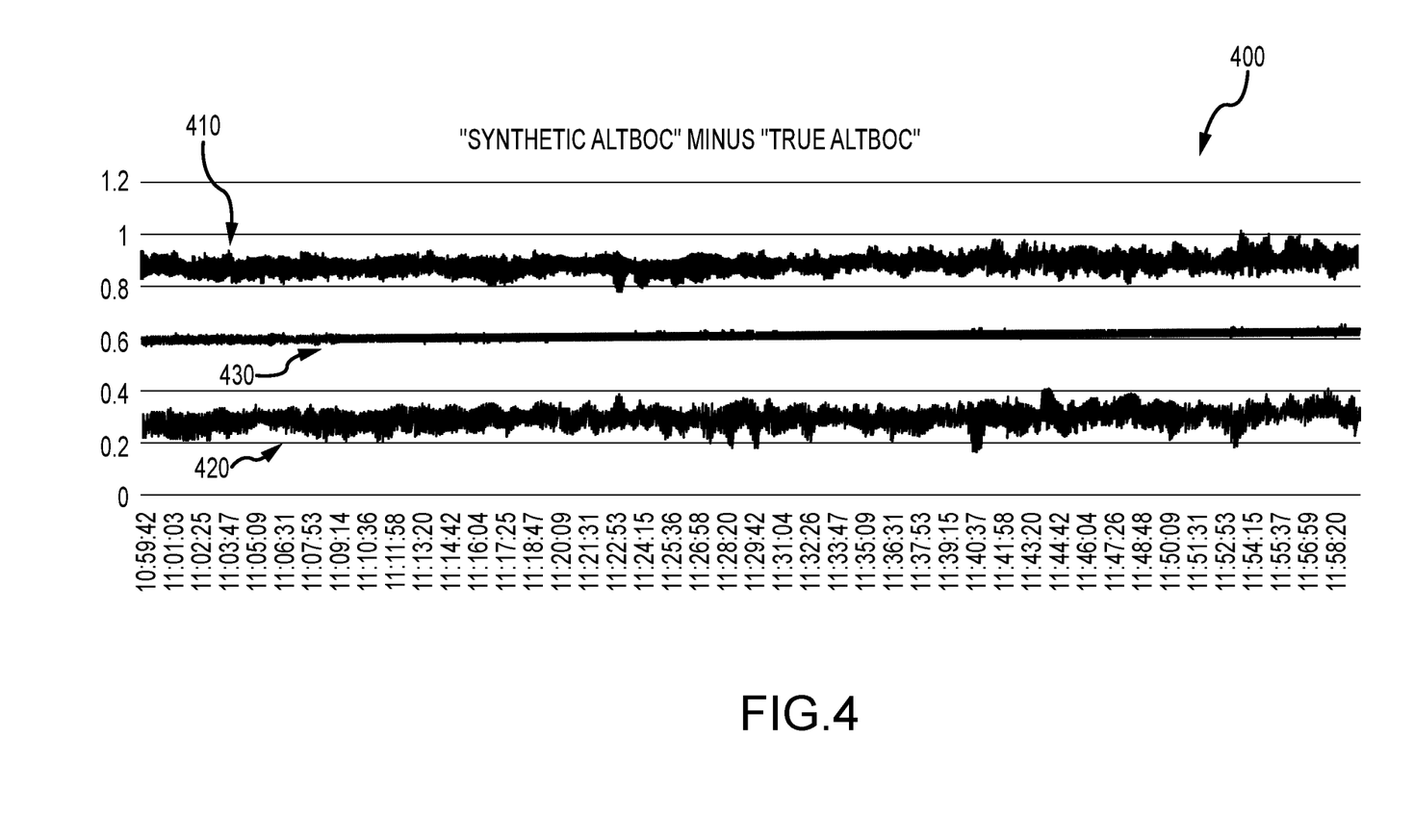
FIG. 4 is a graph or plot showing differences between an E5AltBOC signal generated using E5A signal data only, one generated using E5B signal data only, and one using both signal data with the algorithms and/or methods described herein.

To demonstrate the advantages of the new approach, the inventor recorded data from a GNSS receiver (i.e., a NetR9 receiver), which tracked Galileo E5A signals, E5B signals, and E5AltBOC signals. The inventor created three synthetic AltBOC carrier phase signals for this data and compared them with the original (or "true") AltBOC signal data. In the plot 400 of FIG. 4, line 410 represents the synthetic E5AltBOC reconstructed using E5A signal data only minus the true AltBOC signal data, line 420 represents the synthetic E5AltBOC reconstructed using E5B signal data only minus the true AltBOC signal data, and line 430 represents the synthetic E5AltBOC reconstructed using both E5A and E5B signal data according to techniques described herein. Graph 400 provides a plot of the data from all epochs and all satellites so that one may see the stability of phase bias both between satellites and over time.

Figure 5:
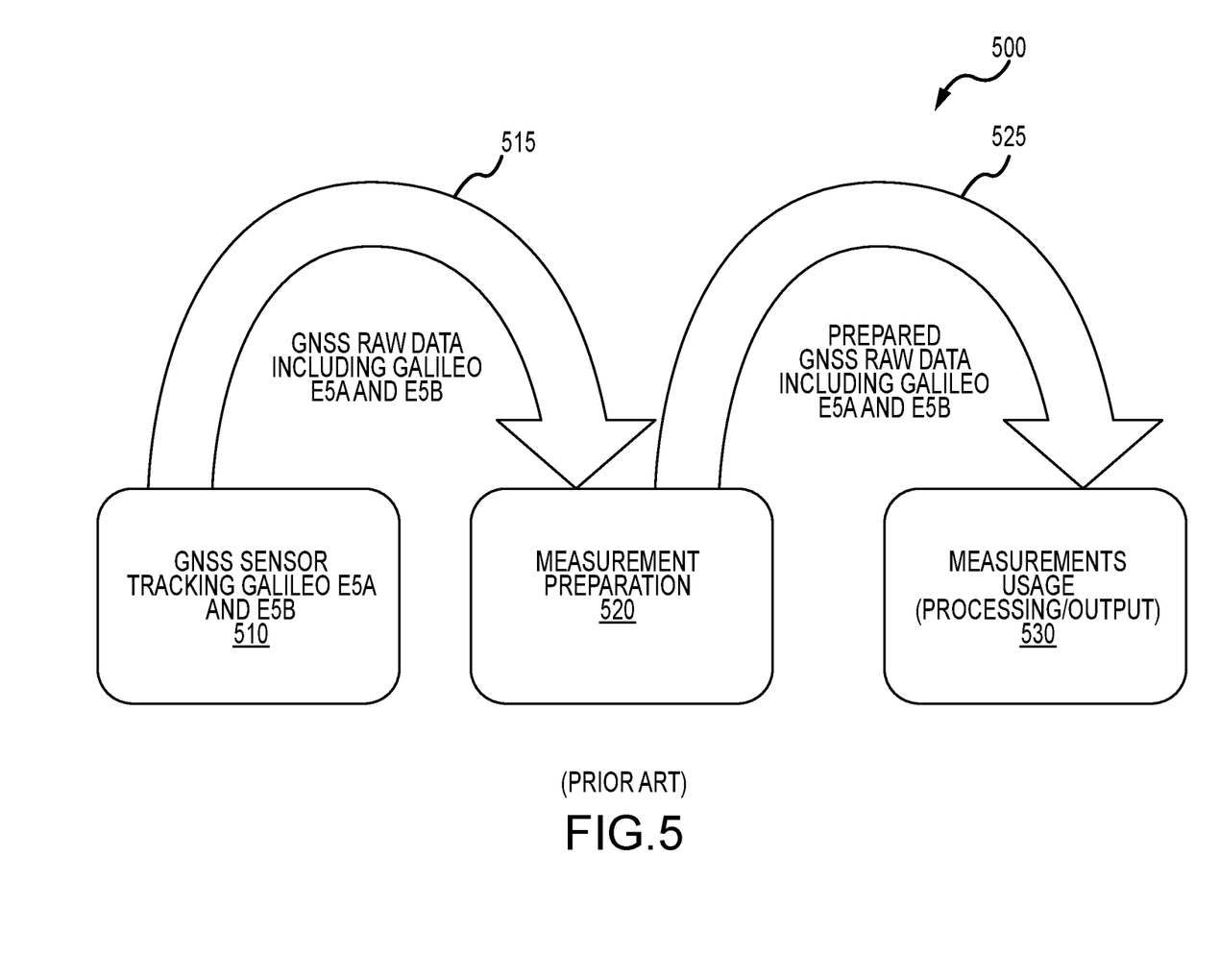
FIG. 5 is a functional block diagram of a conventional GNSS receiver prior to modification based on the present description.

With the above algorithm(s) and/or methods for generating satellite signal data understood, it may be useful to describe how software/firmware for implementing such an algorithm and/or method may be provided and used within a GNSS receiver to enhance its performance in the field. FIG. 5 is a functional block diagram of a conventional GNSS receiver 500 prior to modification based on the present description. As shown, the typical GNSS receiver 500 may be split into three well distinguished blocks, which each may be made up of software, firmware, and/or hardware configured to provide a desired functionality. These three blocks may be labeled, as shown in FIG. 5, the GNSS sensor (or sensor assembly) 510, the measurement preparation module 520, and the measurements usage (or processing and output) module 530.

The GNSS sensor 510 is a block or assembly responsible for tracking satellites, such as those in the Galileo constellation to track the E5A and E5B signals. This block or module 510 of the GNSS receiver 500 operates to receive and track these signals and to provide raw signal data for each tracked signal. This raw data 515 is stored in local memory of the GNSS receiver 500 and/or communicated to the measurement preparation module 520. The raw signal data 515 may include all or a subset of the following: pseudorange, carrier phase, Doppler observables, signal-to-noise ratio, and tracked status flags. The measurement preparation module or block 520 is responsible for data preparation for later usage and output. The module 520 typically is responsible for outlier detection, code smoothing, signal selection for processing and output, data masking, and more. The prepared GNSS raw data (which may include Galileo E5A and E5B signal data) 525 is stored in local memory and/or communicated to the measurements usage module 530. The measurement usage block 530 is responsible for data processing the data 525 in positioning processes (e.g., autonomous, RTK, and so on) and data output (e.g., RTCM3-MSM message, CMRx messages, G-files, T0x-files, and so on) provided locally or sent to other GNSS receivers in a network (e.g., a base station and rover network or the like).

Figure 6:
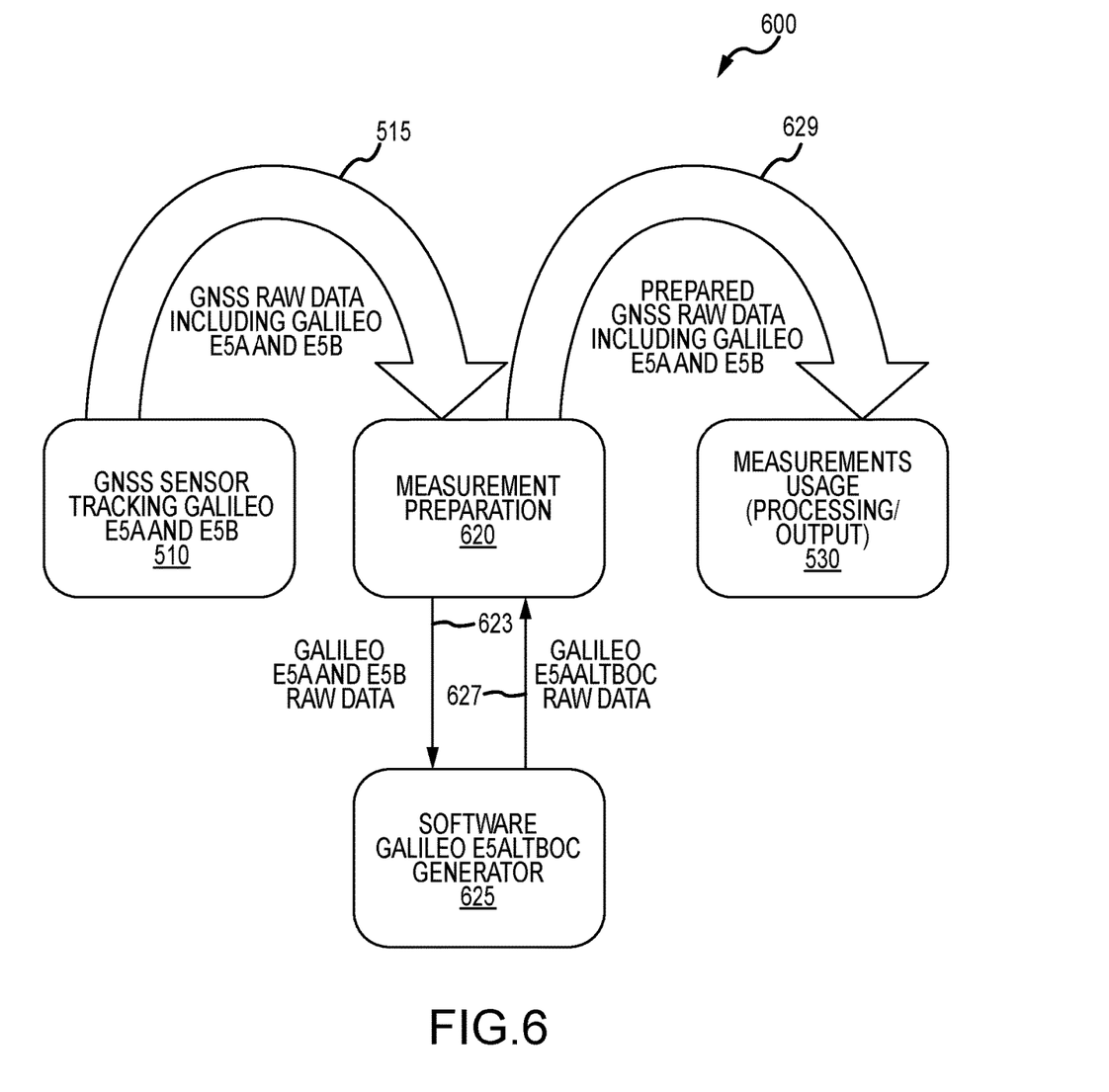
FIG. 6 is a functional block diagram, similar to FIG. 5, of a GNSS receiver that is modified as described herein to provide software-generated signal data.

FIG. 6 is a functional block diagram, similar to FIG. 5, of a GNSS receiver 600 that is modified as described herein to produce and use software-generated signal data. The GNSS receiver 600 includes, like receiver 500, a GNSS sensor assembly 510 that produces GNSS raw data 515 as well as a measurements usage module 530 that processes and communicates out signals and data (as discussed above for receiver 500).

The measurement preparation module 620 may be similarly configured to module 520 of receiver 500, but it is adapted to communicate with or use data produced by a satellite signal (or signal data) generator 625. Particularly, as shown, the measurement preparation module 620 is configured to send raw signal data 515 it receives to the generator module 625 as shown with arrow 623. In the Galileo-based examples described herein, the data 623 would include Galileo E5A and E5B raw signal data. The generator module 625 (as discussed above with regard to the algorithm/method of signal generation) operates to receive the signal raw data 623, to synthesize software-generated raw signal data for a non-tracked signal for the same constellation being tracked by sensor 510. For example, the raw signal data being generated may be Galileo E5AltBOC signal data generated from E5A and E5B raw data 623, which is output as shown with arrow 627 and may include pseudorange, carrier phase, Doppler observables, signal-to-ratio data, flags, and so on.

The measurement preparation module 620 is configured to further process the data 627 as if this data had been received directly from the GNSS sensor 510. Hence, the measurement preparation module 620 outputs prepared GNSS raw data 629 for use by the measurements usage module 530, and this data 629 includes prepared data associated with the software-generated signal data 627 in addition to the tracked signal data 515 (e.g., Galileo E5AltBOC prepared raw data in addition to E5A and E5B prepared raw data).

Figure 7:
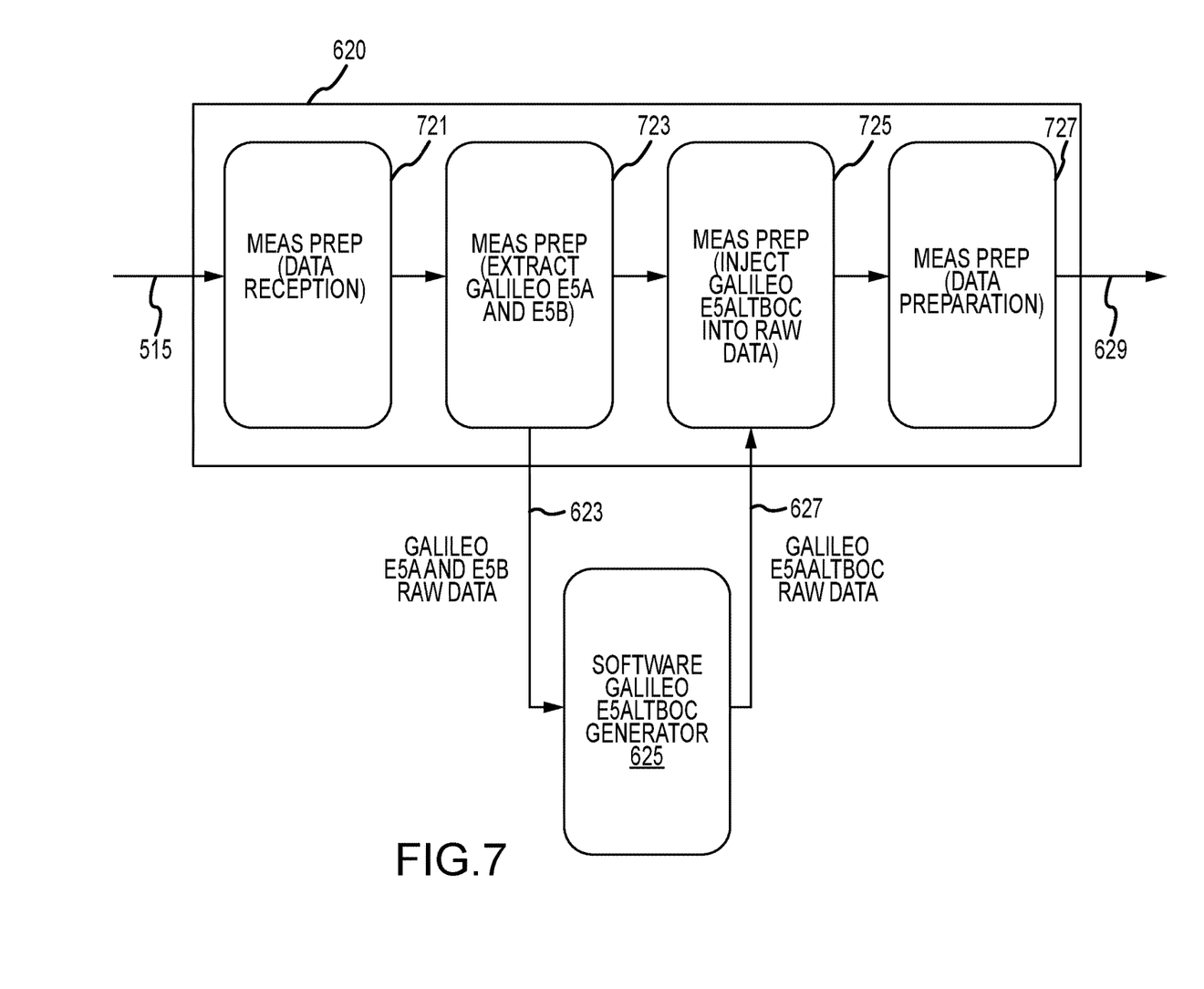
FIG. 7 is a functional block diagram of a portion of the GNSS receiver of FIG. 6 providing more detail of operations or functions and data flow within the measurement preparation block or module.

FIG. 7 is a functional block diagram of a portion of the GNSS receiver 600 of FIG. 6 providing more detail of operations or functions and data flow within the measurement preparation block or module 620. During operations of the GNSS receiver 600, the measurement preparation module 620 performs the steps or functions shown in FIG. 7. Particularly, the module 620 receives the GNSS raw data 515 as part of a data reception step 721. At step 723, the module 620 acts to extract the raw signal data from the received data (e.g., the raw data from the E5A and E5B signals). This data is then transmitted or communicated to the generator 625 as shown by arrow 623, and the generator 625 synthesizes raw signal data for a non-tracked signal (e.g., E5AltBOC raw signal data) as shown with arrow 627. At step 725, the measurement preparation module 620 injects the output signal data from the generator 625 into its raw data for processing (e.g., inserts software-synthesized E5AltBOC raw signal data as if received with data 515). At step 727, the measurement preparation module 620 performs data preparation and as shown with arrow 629 outputs the prepared data for use by the measurements usage module 530.

Figure 8:
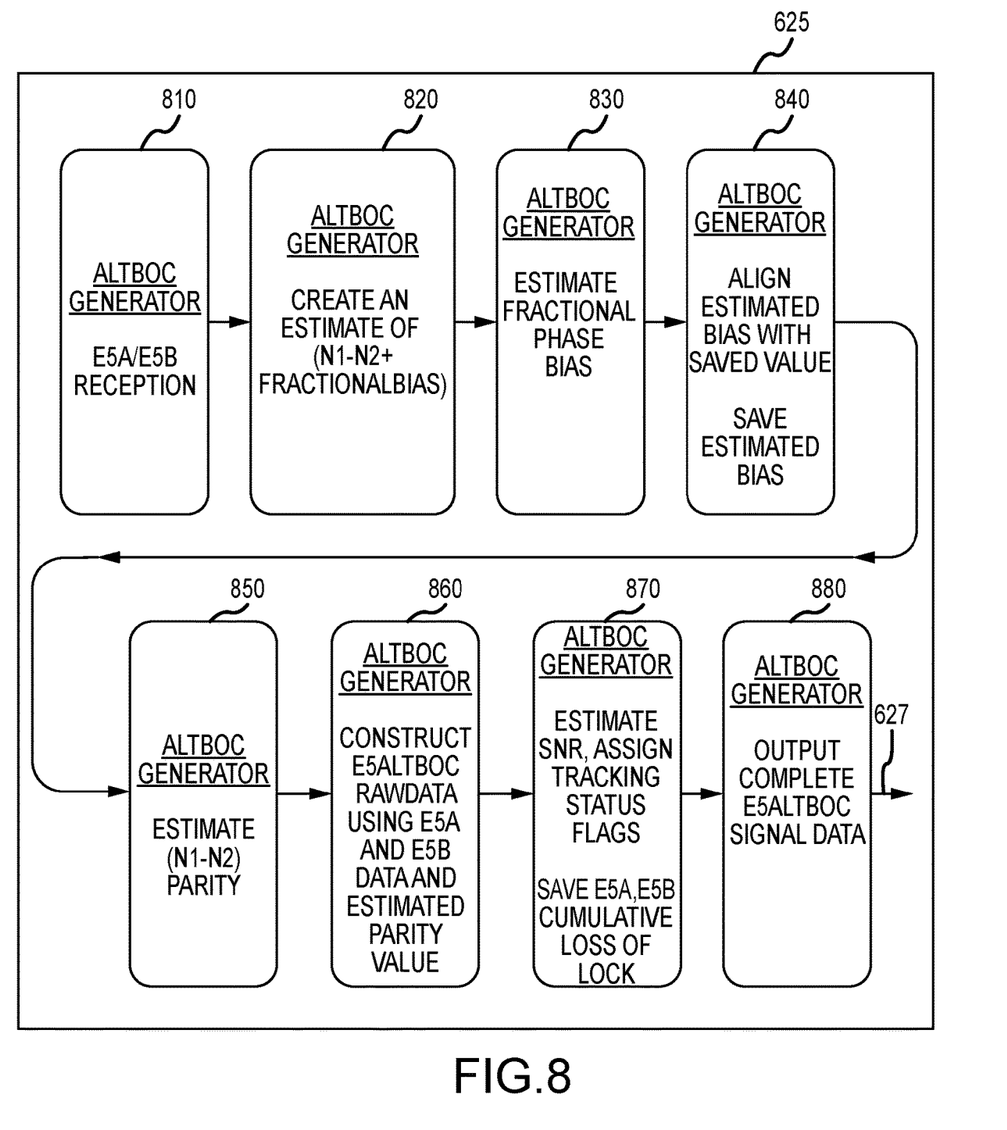
FIG. 8 is a functional block diagram of the signal data generator of the GNSS receiver of FIG. 6 showing operations or functions and data flow within this software/firmware block or module.

FIG. 8 is a functional block diagram of the signal data generator 625 of the GNSS receiver 600 of FIG. 6 showing operations or functions and data flow within this software/firmware block or module during use of the GNSS receiver 600. As shown, at step 810, the generator 625 receives the raw signal data for tracked satellite signals from the measurement preparation module (e.g., reception of E5A and E5B signal data in the Galileo constellation example). In step 820, the generator constructs A1 and A2 data to generate, for example, AltBOC signal data from E5A and E5B signal data. At step 830, the generator 625 estimates fractional carrier phase bias (A1−A2). In step 840, the generator 625 aligns the estimated bias from step 830 with a saved value and the estimated bias is saved.

In step 850, the generator 625 acts to estimate parity (N1−N2). Then, in step 860, the generator 625 constructs the raw data for the synthesized satellite signal, which may involve generating E5AltBOC raw signal data using the received E5A and E5B signal data and the estimated parity value from step 850. In step 870, the generator 625 estimates SNR, assigns tracking status flags, and saves E5A, E5B cumulative loss of lock. At step 880, the generator 625 functions to output the completed signal data, with arrow 627 showing communication of this data to the measurement preparation module.

Figure 9:
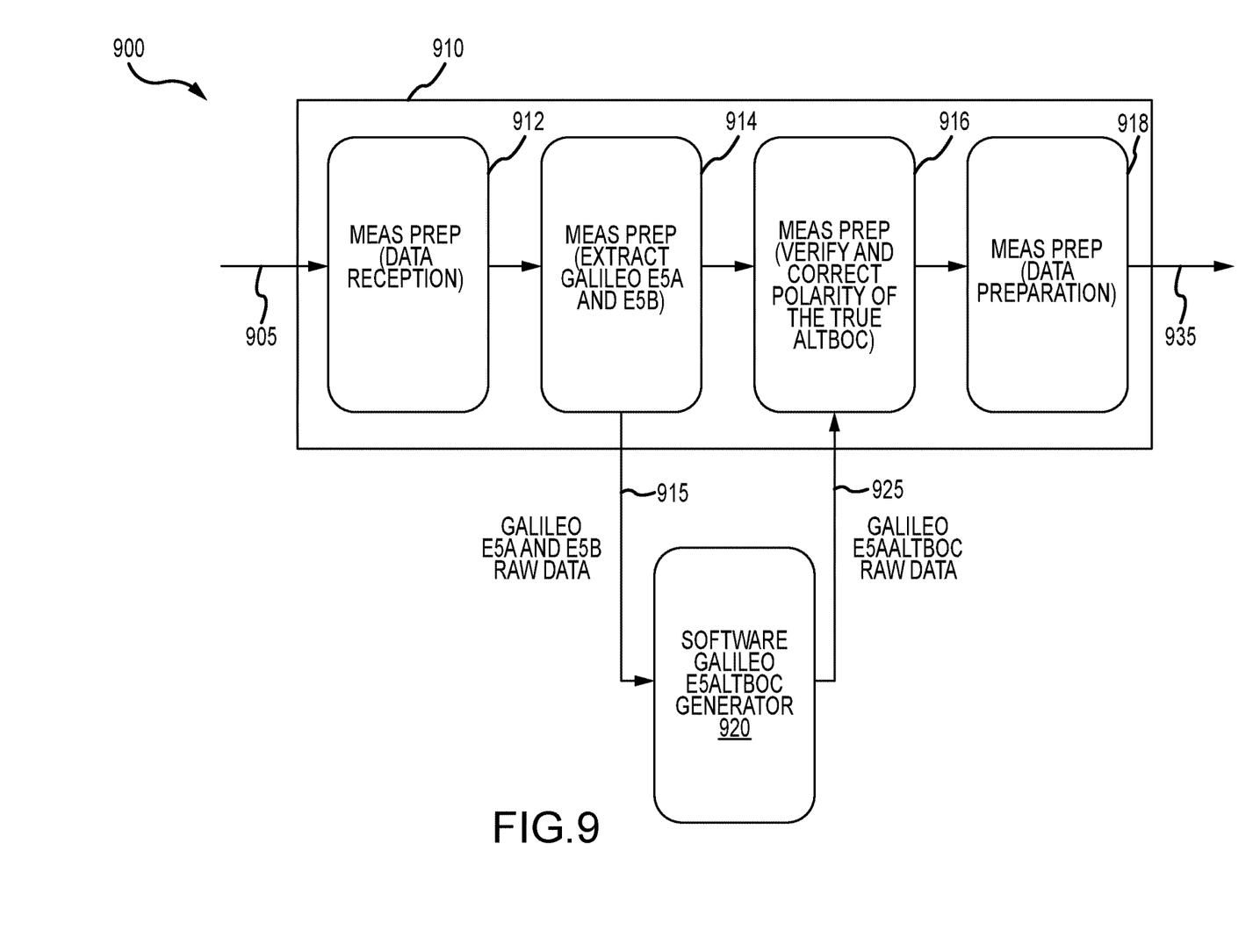
FIG. 9 is a functional block diagram similar to FIG. 7 of a portion of a GNSS receiver (such as a receiver similar to that of FIG. 6) that is configured for true AltBOC signal tracking showing details of the steps or functions performed by and data flow within the measurement preparation block or module during operations of the GNSS receiver.

FIG. 9 is a functional block diagram, similar to FIG. 7, of a portion of a GNSS receiver 900 (such as a receiver similar to that of FIG. 6) that is configured for true AltBOC signal tracking. FIG. 9 shows details of the steps or functions performed by and data flow within the measurement preparation block or module 910 during operations of the GNSS receiver 900. As shown with arrow 905, raw signal data in the form of Galileo E5AltBOC signal data is communicated to the measurement preparation block 910 and received at step 912. In step 914, the measurement preparation block 910 extracts from the data received in step 912 the E5A and E5B raw signal data, which is then communicated to the satellite signal generator 920 as shown by arrow 915.

The generator 920 processes the raw data 915 it receives (as discussed above) to generate Galileo E5AltBOC raw signal data that is then output as shown with arrow 925 for use by the measurement preparation module 910. Particularly, in step 916, the measurement preparation module 910 verifies and corrects polarity of the true or received E5AltBOC signal data using the generated raw signal data 925. Then, at step 918, the measurement preparation module 910 completes data preparation of the signal data and outputs messages with or based on this processed E5AltBOC signal data (as discussed above for GNSS receiver 600) as shown with arrow 935.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

As note herein, one prior technique can be used to generate a non-tracked signal out of a single tracked one, but the quality of such a signal is not very high due to noise and biases introduced by code. The prior technique does, however, maintain the integer nature of ambiguities and, thus, is relatively simple to generate.

The new approach or technique taught herein, in contrast, is aiming at building a high-quality signal by utilizing a pair of real signals. The quality of such signal is very high such that it is pretty much on the level of an original signal. However, this approach is more complicated since it includes half-a-cycle ambiguity resolution. The new approach enables the usage of synthetic data for a reference receiver, and, most probably, a single-band-generated signal would not be good enough for this. This description also teaches the new usage of synthetic data to verify, monitor and correct polarity of a true signal. The higher quality of dual-band-generated AltBOC signal allows its usage in high-end products, which would not be reasonable for a single-band-generated signal. Hence, while the prior techniques may be useful for some low-end RTK rovers, the new techniques taught herein provide a novel solution for use in high-end RTK base and rover receivers.

I claim:

1. A receiver for processing satellite signals, comprising:
   an antenna assembly with a sensor tracking assembly tracking and receiving satellite signals from a constellation of Global Navigation Satellite System (GNSS) satellites, wherein the constellation is Galileo and wherein the received satellite signals comprise E5AltBOC signals;
   a processor;
   a satellite signal generator module, provided by the processor executing code;
   a measurement preparation module extracting E5A and E5B raw data from the received satellite signals, wherein the satellite signal generator generates E5AltBOC raw signal data from the extracted E5A and E5B raw data, wherein the measurement preparation module verifies and corrects polarity of the E5AltBOC signals in the received satellite signals using the generated E5AltBOC raw signal data, and wherein the measurement preparation module processes the generated E5AltBOC raw signal data with corrected polarity to generate prepared GNSS raw signal data; and a measurements usage module processing the prepared GNSS raw signal data to determine a geographical position solution.

2. The receiver of claim 1, wherein the generated E5AltBOC raw signal data comprises an E5AltBOC pseudorange comprising a mean value of pseudoranges in the E5A and E5B raw data.

3. The receiver of claim 1, wherein the generated E5AltBOC raw signal data comprises an E5AltBOC Doppler observable comprising a mean value of Doppler observable in the E5A and E5B raw data.

4. The receiver of claim 1, wherein the generated E5AltBOC raw data comprises E5AltBOC carrier phase data comprising a mean value of carrier phase data in the E5A and E5B raw data.

5. The receiver of claim 4, wherein the satellite signal generator module determines when a half-a-cycle ambiguity is present for the mean value of carrier phase data in the E5A and E5B raw data and, when present, eliminating the half-a-cycle ambiguity.

6. The receiver of claim 1, further comprising a transceiver establishing a communication link with a spaced-apart GNSS receiver and receiving data from the spaced-apart GNSS receiver including correction data associated with the generated satellite signal data.

7. The receiver of claim 1, further comprising a transceiver establishing a communication link with a spaced-apart GNSS receiver operating as a rover and transmitting the generated satellite signal data for use in RTK positioning operations.

8. A receiver for processing satellite signals, comprising:
a processor;
a GNSS sensor tracking Galileo E5A and E5B signals;
a satellite signal generator module, provided by the processor executing code, generating satellite signal data for a Galileo E5AltBOC signal by processing, in combination, raw signal data associated with both the Galileo E5A signal and the E5B signal tracked by the GNSS sensor; and
a measurement preparation module processing the generated satellite signal data to generate prepared E5AltBOC raw signal data.

9. The receiver of claim 8, further comprising a measurements usage module processing the prepared E5AltBOC raw signal data to determine a geographical position solution.

10. The receiver of claim 8, wherein the generated satellite signal data comprises an E5AltBOC pseudorange comprising a mean value of pseudoranges in the E5A and E5B signals, wherein the generated satellite signal data comprises an E5AltBOC Doppler observable comprising a mean value of Doppler observable in the E5A and E5B signals, and wherein the generated satellite signal data comprises E5AltBOC carrier phase data comprising a mean value of carrier phase data in the E5A and E5B signals.

11. The receiver of claim 10, wherein the satellite signal generator module determines when a half-a-cycle ambiguity is present for the mean value of carrier phase data in the E5A and E5B signals and, when present, eliminating the half-a-cycle ambiguity during the generating of the generated satellite signal data.

12. The receiver of claim 8, further comprising a transceiver establishing a communication link with a spaced-apart GNSS receiver and receiving data from the spaced-apart GNSS receiver including correction data associated with the generated satellite signal data.

13. The receiver of claim 8, further comprising a transceiver establishing a communication link with a spaced-apart GNSS receiver operating as a rover and transmitting the generated satellite signal data for use in RTK positioning operations.

14. A receiver for processing satellite signals, comprising:
a processor;
a GNSS sensor tracking Galileo E5AltBOC signals;
a measurement preparation module extracting E5A and E5B raw signal data from the tracked Galileo E5AltBOC signals;
a satellite signal generator module, provided by the processor executing code, generating satellite signal data for a E5AltBOC signal synthesized by processing the E5A and E5B raw signal data, wherein the measurement preparation module processes the generated satellite signal data along with raw signal data associated with the tracked Galileo E5AltBOC signals to generate prepared signal data; and
a measurements usage module processing the prepared signal data to determine a geographical position solution.

15. The receiver of claim 14, wherein the measurement preparation module verifies and corrects polarity of the tracked Galileo E5AltBOC signals using the generated satellite signal data.

16. The receiver of claim 15, further comprising a transceiver establishing a communication link with a spaced-apart GNSS receiver operating as a rover and transmitting the prepared signal data with corrected polarity for use in RTK positioning operations.

* * * * *